(12) United States Patent
Bryant

(10) Patent No.: US 10,710,907 B2
(45) Date of Patent: Jul. 14, 2020

(54) HYDRODYNAMIC SEPARATORS, ASSEMBLIES AND METHODS FOR STORM WATER TREATMENT

(71) Applicant: Graham J. Bryant, Westfield, NJ (US)

(72) Inventor: Graham J. Bryant, Westfield, NJ (US)

(73) Assignee: Hydroworks, LLC, Clark, NJ (US)

( * ) Notice: Subject to any disclaimer, the term of this patent is extended or adjusted under 35 U.S.C. 154(b) by 7 days.

(21) Appl. No.: 16/243,192

(22) Filed: Jan. 9, 2019

(65) Prior Publication Data

US 2019/0210894 A1 Jul. 11, 2019

Related U.S. Application Data

(60) Provisional application No. 62/615,618, filed on Jan. 10, 2018.

(51) Int. Cl.
| | |
|---|---|
| *E03F 5/14* | (2006.01) |
| *B01D 21/26* | (2006.01) |
| *C02F 1/40* | (2006.01) |
| *B01D 21/02* | (2006.01) |
| *B01D 21/00* | (2006.01) |
| *E03F 5/16* | (2006.01) |
| *C02F 1/38* | (2006.01) |
| *E03F 5/04* | (2006.01) |
| *B01D 21/24* | (2006.01) |
| *C02F 103/00* | (2006.01) |

(Continued)

(52) U.S. Cl.
CPC ............ *C02F 1/40* (2013.01); *B01D 21/0036* (2013.01); *B01D 21/0042* (2013.01); *B01D 21/02* (2013.01); *B01D 21/2411* (2013.01); *B01D 21/265* (2013.01); *C02F 1/38* (2013.01); *E03F 5/0403* (2013.01); *E03F 5/14* (2013.01); *E03F 5/16* (2013.01); *C02F 2001/007* (2013.01); *C02F 2101/32* (2013.01); *C02F 2103/001* (2013.01); *C02F 2301/026* (2013.01)

(58) Field of Classification Search
CPC .. E03F 5/0403; E03F 5/14; E03F 5/16; B01D 21/0036; B01D 21/0042; B01D 21/2411; B01D 21/265; C02F 1/40; C02F 2103/001
USPC .. 210/170.03, 512.1, 521, 532.1, 538, 747.2
See application file for complete search history.

(56) References Cited

U.S. PATENT DOCUMENTS

| 6,120,684 A | 9/2000 | Kistner et al. |
| 6,241,881 B1 | 6/2001 | Pezzaniti |

(Continued)

FOREIGN PATENT DOCUMENTS

EP 2 181 748 B1 7/2013

OTHER PUBLICATIONS

International Search Report for priority PCT Application No. PCT/US2019/12813, dated Apr. 9, 2019, 2 pages.

(Continued)

*Primary Examiner* — Christopher Upton
(74) *Attorney, Agent, or Firm* — Hoffmann & Baron, LLP

(57) ABSTRACT

A hydrodynamic separator for storm water includes weirs and a first plate within a housing to create a pretreatment area for the storm water. The separator further includes a hollow inner member for inducing rotational flow of water and having an outlet below the first plate which outlet is connected to a lower second plate. Solids further settle from the water in the housing below the lower second plate. A water exit path exists between the two plates.

20 Claims, 10 Drawing Sheets

(51) Int. Cl.
*C02F 1/00* (2006.01)
*C02F 101/32* (2006.01)

(56) References Cited

U.S. PATENT DOCUMENTS

| | | | | |
|---|---|---|---|---|
| 6,547,962 | B2 * | 4/2003 | Kistner | E03F 5/16 |
| | | | | 210/170.03 |
| 6,641,720 | B1 | 11/2003 | Crompton et al. | |
| 6,913,155 | B2 | 7/2005 | Bryant | |
| 6,951,619 | B2 | 10/2005 | Bryant | |
| 7,001,527 | B2 | 2/2006 | Stever et al. | |
| 7,022,243 | B2 | 4/2006 | Bryant | |
| 7,182,874 | B2 * | 2/2007 | Allard | E03F 5/14 |
| | | | | 210/170.03 |
| 7,422,683 | B2 * | 9/2008 | Park | E03F 5/14 |
| | | | | 210/170.03 |
| 7,507,333 | B2 | 3/2009 | Meyermann | |
| 2007/0108122 | A1 * | 5/2007 | Andoh | B01D 21/2411 |
| | | | | 210/512.1 |
| 2009/0020466 | A1 * | 1/2009 | Williams | E03F 5/14 |
| | | | | 210/170.03 |
| 2015/0048014 | A1 | 2/2015 | Anastasio et al. | |
| 2016/0160489 | A1 * | 6/2016 | Garbon | E03F 5/0403 |
| | | | | 210/170.03 |
| 2019/0078310 | A1 * | 3/2019 | Kent | E03F 5/14 |

OTHER PUBLICATIONS

International Written Opinion for priority PCT Application No. PCT/US2019/12813, dated Apr. 9, 2019, 5 pages.

\* cited by examiner

HYDRODYNAMIC SEPARATORS, ASSEMBLIES AND METHODS FOR STORM WATER TREATMENT

CROSS-REFERENCE TO RELATED APPLICATIONS

This application claims the benefit of U.S. Provisional Patent Application No. 62/615,618, filed Jan. 10, 2018, the contents of which are incorporated herein by reference.

FIELD OF THE INVENTION

The present invention generally relates to a device for treating storm water. In particular, the present invention relates to a hydrodynamic separator for storm water treatment or removal of oil and sediment or suspended solids.

BACKGROUND OF THE INVENTION

Treatment of storm water to remove some degree of oil and solids before entering storm sewer piping is often an important environmental consideration. While separators have been used in the past, they often do not provide adequate treatment of the storm water and may be difficult to access for maintenance.

BRIEF SUMMARY OF THE INVENTION

The present invention is directed towards a hydrodynamic separator capable of removing solids, debris and lighter than water (oil, trash, floating debris) pollutants from storm water. In particular, the present invention is directed towards a hydrodynamic by-pass separator. The hydrodynamic separator of the present invention may include a protected submerged pretreatment zone to collect larger solids, a treatment tank to remove finer solids, and a dual set of weirs to create a high flow bypass, if needed during periods of high water flows. High water flows are conveyed to the outlet of the separator via the high flow bypass and do not substantially enter the treatment area. The submerged pretreatment area, however, still allows removal of coarse solids during high flows.

Under normal or low storm water flows, water enters an inlet area having a horizontal grate. The area underneath the grate is submerged under the water level and has openings in fluid communication to the main treatment area of the separator. Coarse solids fall through the grate and are either trapped in the pretreatment area or conveyed into the main treatment area depending on the flow rate. Finer solids are transported into the main treatment area. Openings and weirs in the pre-treatment area allow entry of water and finer solids into the main treatment area. The openings and weirs are configured to cause the water to rotate in the main treatment area creating a vortex motion. Water in the main treatment area is forced to rise along the walls of the separator to discharge from the treatment area to the downstream pipe.

The vortex motion forces solids and floatables to the middle of the inner chamber of the main treatment area. Floatables are trapped since the inlet to the treatment area is submerged. The present invention maximizes the retention of settled solids since solids are forced to the center of the inner chamber by the vortex motion of water while water must flow up the walls of the separator to discharge into the downstream pipe.

A set of high flow weirs near the outlet pipe create a high flow bypass over both the pretreatment area and main treatment chamber. The rate of flow into the treatment area is regulated by the number and size of openings into the treatment chamber and the height of bypass weirs. High storm water flows may flow over the high or bypass weirs directly to the outlet pipe preventing the scour and resuspension of any fines collected in the treatment chamber.

In greater detail, the hydrodynamic separator according to the present invention is configured to remove oil and suspended solids from storm water. The hydrodynamic separator includes several key areas, such as but not limited to: a) pretreatment area; b) inlet area to inner chamber between high and low weirs; c) inner chamber where rotational flow is created; d) treatment chamber of separator; and e) outlet disk for discharge of clean water from treatment chamber.

A central inner chamber may be provided to facilitate multiple inlet pipes similar to U.S. Pat. No. 6,913,155, the contents of which are incorporated herein by reference in their entirety, and to provide central access for cleaning the treatment chamber Weirs on either side of the inner chamber that allow water to enter the inner chamber tangentially to create a rotational motion inside the inner chamber. Both low and high flow weirs (similar to U.S. Pat. No. 6,913,155) may be used to create a submerged pretreatment area below the low weirs and high flow bypass above the high weirs. The submerged pretreatment area upstream of the low weirs captures larger sediment during both low and high flows since the floor of the pretreatment area is set below the invert of the outlet pipe.

Slats or grating may be provided above the submerged pretreatment area at the level of the outlet pipe invert to protect any sediment deposited in this area from scouring during high flow and to provide a quiescent area below the flow for settling solids.

Openings from the submerged area to the inner chamber are oriented to create rotational flow in the inner chamber. Openings to the inner chamber between the low and high weirs are also oriented to create a rotational flow in the inner chamber.

The high weirs behind the low weirs also provide a high flow bypass to minimize the potential for resuspension in the treatment tank during periods of high water flows.

Use of an outlet disk may force water to rise along the sides of the separator and across the outlet disk prior to discharge from the treatment tank. Use of an optional lower disk may further protect any solids settled on the bottom of the tank from scouring during periods of high flow.

Maintenance access to the bottom of the treatment tank may be provided through a central access way (inner chamber).

These and other features and advantages of the present invention will become apparent from the following detailed description of illustrative embodiments thereof, which is to be read in connection with the accompanying drawings. Corresponding reference element numbers or characters indicate corresponding parts throughout the several views of the drawings.

DETAILED DESCRIPTION OF THE INVENTION

In recent years engineers have increasingly used customized separators as junction structures, using them to join several pipes and to treat them prior to discharging downstream. The design of the separator of the present invention facilitates the use of the structure as, inter alia, a junction structure without the need to customize the design, which is often required for separators currently being used.

Accordingly, several improvements are made over the designs of existing separators to facilitate an increasing number of design environments and objectives. The primary features of the new and inventive design include, inter alia:

1. Moving the inner chamber from one side to the middle to facilitate multiple inlet pipes.
2. Creating weirs on either side of the inner chamber that allow water to enter the inner chamber tangentially to create a rotational motion inside the inner chamber.
3. Creating a submerged pre-treatment area upstream of the weirs to capture larger sediment to increase the sedimentation potential of the separator. This is achieved through the use of a set of two weirs (lower and higher).
4. Reducing the length of the inner chamber to allow cleaning of the entire separator floor from the inner chamber.
5. Providing a complete high flow bypass above the higher weirs to minimize the potential for resuspension.
6. The use of an outlet disk to force water to rise along the sides of the separator prior to discharge.
7. The use of a secondary disk in the lower chamber (optional) to reduce tank depth and protect sediment below the disk from scour and resuspension.

Operation of the hydrodynamic separators of the present invention are described below in conjunction with FIGS. 1-11.

Figure 1:
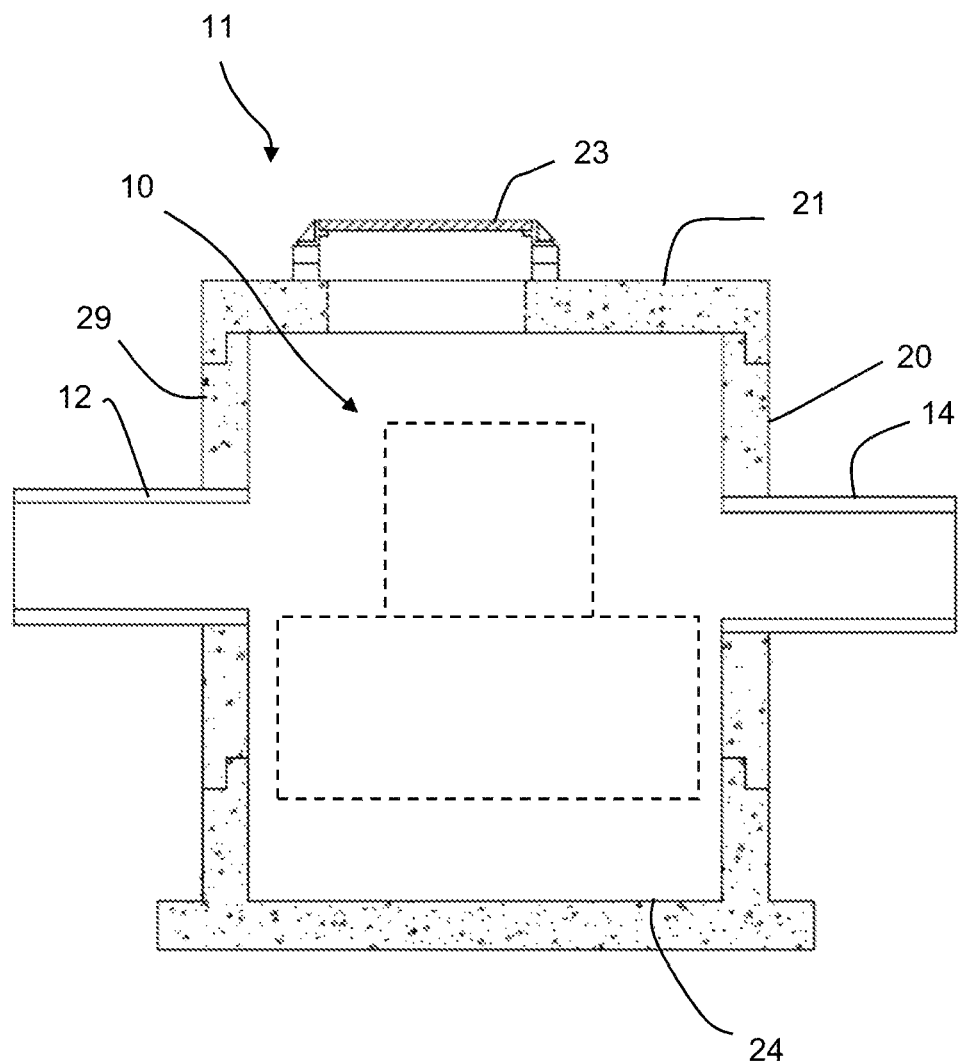
FIG. 1 is a side elevational view of the hydrodynamic separator of the present invention located within a housing having a cover.

FIG. 1 is a side elevational view of the separator system 11 of the present invention. As depicted in FIG. 1, the separator system 11 of the present invention may include a hydrodynamic separator 10 located within a structure or outer housing 20. In FIG. 1, the hydrodynamic separator 10 is shown simply in phantom or as a dashed object. The hydrodynamic separator 10 of the present invention is shown in FIGS. 2-11. The outer housing 20 includes a base or bottom floor 24, a riser or outer housing wall 29, a cover or outer housing top portion 21 and a removable cap 23 for access into the outer housing 20. An inlet 12 for the ingress of water and an outlet 14 for the egress of water are disposed through the outer housing wall 29. While only one inlet 12 is depicted in FIG. 1, the present invention is not so limited. The outer housing 20 may contain one or more inlets 12.

Figure 2:
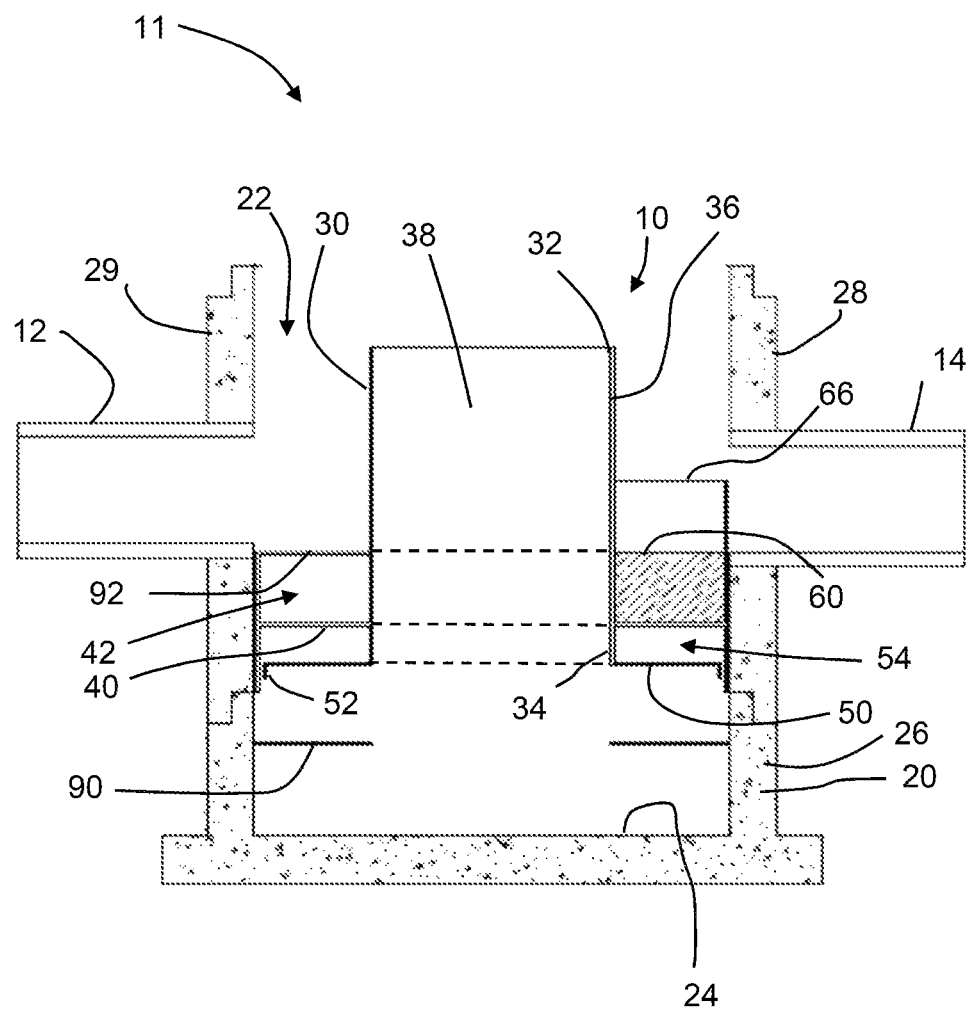
FIG. 2 is the side elevational view of the hydrodynamic separator of FIG. 1, but taken below the cover of the housing for convenience of element numbering.
Figure 3:
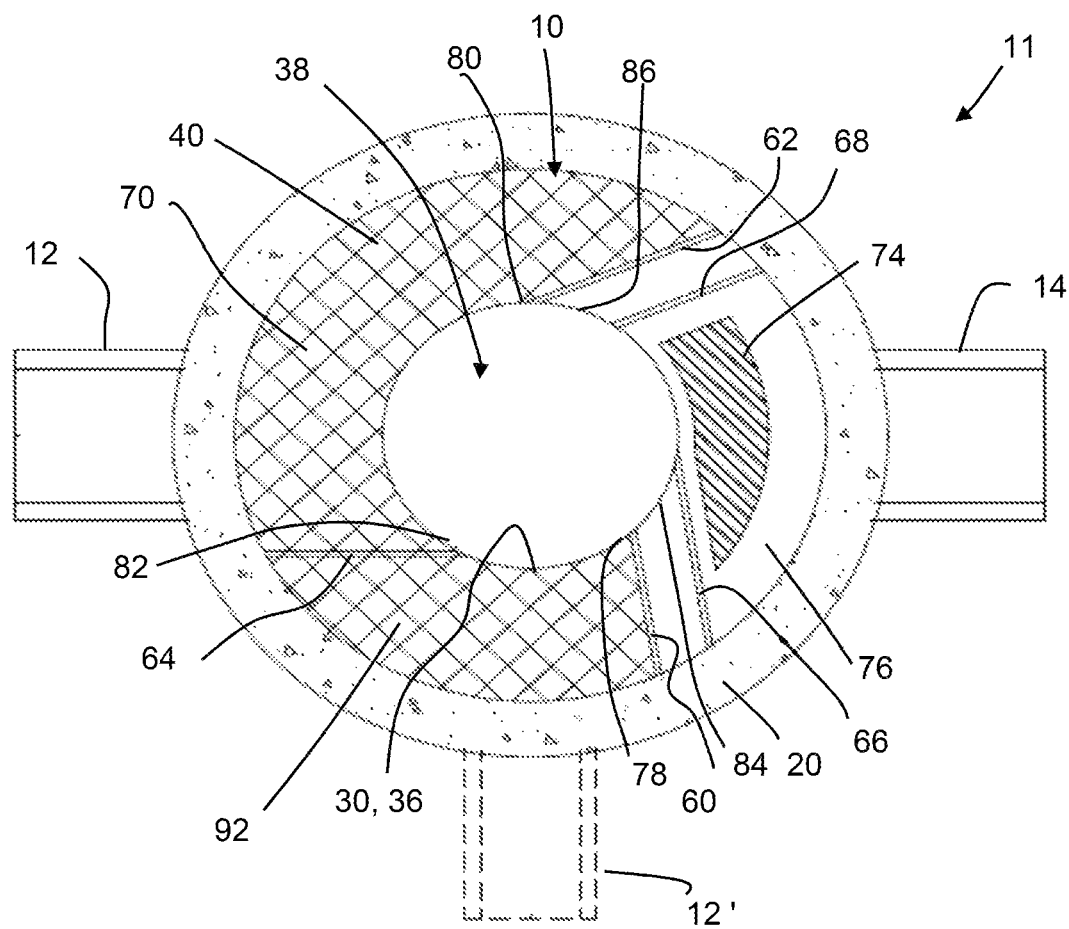
FIG. 3 is a top planar view of the hydrodynamic separator of the present invention, including FIG. 1.

The hydrodynamic separator 10 of the present invention is further described in conjunction with FIGS. 2-10. FIG. 2 is the side elevational view of the hydrodynamic separator 10 of FIG. 1. In FIG. 2, however, the outer housing top portion 21 and the removable cap 23 of the outer housing 20 is removed simply for ease of illustration, for example ease of placement of element reference numbers associated with the hydrodynamic separator 10. FIG. 3 is a top planar view of the hydrodynamic separator 10 of the present invention.

As depicted in FIGS. 2 and 3, the hydrodynamic separator 10 is securably disposed within a hollow chamber 22 of the outer housing 20. The outer housing 20 or outer housing wall 29 includes an upper portion or upper side wall 28, an opposed lower portion or lower side wall 26. The upper side wall 28 is generally above the inlet 12, typically in the form of a pipe or conduit, and the outlet 14, typically in the form of a pipe or conduit. The lower side wall is generally below the inlet 12 and the outlet 14.

Water (not shown) enters the outer housing 20 via the inlet 12. Water flowing from the inlet 12 enters the hydrodynamic separator 10 above a horizontal grate 92. The horizontal grate 92 may be configured as a structure containing slots or openings. Solids (not shown) in the water from the inlet 12 fall below the horizontal grate 92 into a pre-treatment area 42. The pre-treatment area 42, including, if desired, the horizontal grate 92 extends from the inlet 12 towards two sets of lower weirs, i.e., a first lower weir 60 and a second lower weir 62, near the outlet 14 of the outer housing 20, thereby defining a first location 70 for ingress of water into the hydrodynamic separator 10. The first and second lower weirs 60, 62 may have a height generally corresponding to the floor or bottom of the inlet 12. Such heights are, however, non-limiting. Lower weirs 60, 62 may extend above the floor or bottom of the inlet 12 to backup water in the pipe 12 during periods of flow to increase storage/settling in the system 11, or may even extend below the floor or bottom of the inlet 12.

The horizontal grate 92 is, however, optional. The horizontal grate 92 helps, but is not required, to prevent scour or undesirable movement of solids (not shown) settled below the grate 92 during periods of peak or high flow of storm water into the system 11.

The pre-treatment area 42 below the horizontal grate 92 is generally full of water as the horizontal grate 92 is generally level or in line with the elevation of the outlet 14 of the outer housing 20. The depth of water below the horizontal grate 92 may be determined by the height of the outlet 14 elevation. At the bottom of the pre-treatment area 42 is a solid horizontal disk or first plate 40 that extends from the inlet 12 to the inner chamber or hollow inner member 30 of the hydrodynamic separator 10 and to both the first and second lower weirs 60, 62 of the hydrodynamic separator 10. The hydrodynamic separator 10 includes are holes 78, 80 (shown in FIGS. 9 and 10) through the wall 36 of the hydrodynamic separator 10 for allowing water and solids to enter into the hollow inner portion 38 of the inner member or chamber 30 from the pre-treatment area 42 on an upstream side of the first and second lower weirs 60, 62. The hydrodynamic separator 10 may include an optional third lower weir 64 parallel, or otherwise configured, with the inlet pipe 12 with an opening or inlet 82 through the wall 36 and into the inner chamber 30 at a location near where the weir 64 meets the inner chamber 30. This may be useful, if desired, to compartmentalize the pre-treatment area making it less susceptible to scour and to also increase the rotational flow of water within the hollow inner portion 38 of the inner chamber 30. In one test structure with about a four foot (or about 1.2 meter) diameter, the openings may be approximately 1.5 square inches (or about 10 square centimeters). Such dimensions are non-limiting and may be larger or smaller as desired. The openings may have any suitable shape, for example, circular, oval, square, rectangular, and the like.

In normal operation, the water level may be at or near the top of grate 92 and/or the top of the first and second lower weirs 60, 62. Water may flow towards and over the first and second lower weirs 60, 62 near the outlet 14 of the hydrodynamic separator 10. There may be first and second higher weirs 66, 68 near and behind the first and second lower weirs 60, 62, respectively, to prevent water from going to the outlet 14 under low flow conditions.

The height of the first and second higher weirs 66, 68 are generally larger than the heights of the first and second lower weirs 60, 62. For example, the heights of the higher weirs 66, 68 may extend upward to about the middle of the outlet 14 or outlet pipe 14. Such height extents are non-limiting, and other height extents may suitably be used. For example, the first and second higher weirs 66, 68 may extend upward to a location or locations above the middle of the outlet pipe 14 or even below the middle of the outlet pipe 14. Between the first lower weir 60 and the first higher weir 66 there may be an opening 84 (depicted in FIG. 84) through the wall 36 of the inner chamber 30, and between the second lower weir 62 and the second higher weir 68 there may be an opening 86 (depicted in FIG. 10) through the wall 36 of the inner chamber 30. These openings 84, 86 between lower and higher weirs 60, 62, 66, 68 may be larger openings than the openings 78, 80, 82 near upstream portions of the pretreatment area 42 near weirs 60, 64, 66, respectively. For example, in a four foot (1.2 meter) test unit, i.e., diameter of the outer housing 20, these openings 84, 86 are approximately 5 inches (12.7 centimeters) wide by four inches (10.2 centimeters) tall between the first and second lower weirs 60, 62 and first and second upper weirs 66,68. These openings 84, 86 may function or may be configured as main entrance points for water entering the inner chamber 30. The weirs 60, 62, 64, 66, 68 are specifically laid out to create a rotation of water, such as, but not limited to, counterclockwise rotational pattern, within the hollow inner portion of the inner chamber 30 to minimize turbulence and maximize settling.

The hydrodynamic separator 10 is not limited to a single inlet 12. The hydrodynamic separator 10 may include one or more additional inlets, such as inlet 12' as depicted in phantom in FIG. 3. The one or more inlets 12' should be in fluid communication with the first location 70 for ingress of water into the hydrodynamic separator 10.

Figure 4:
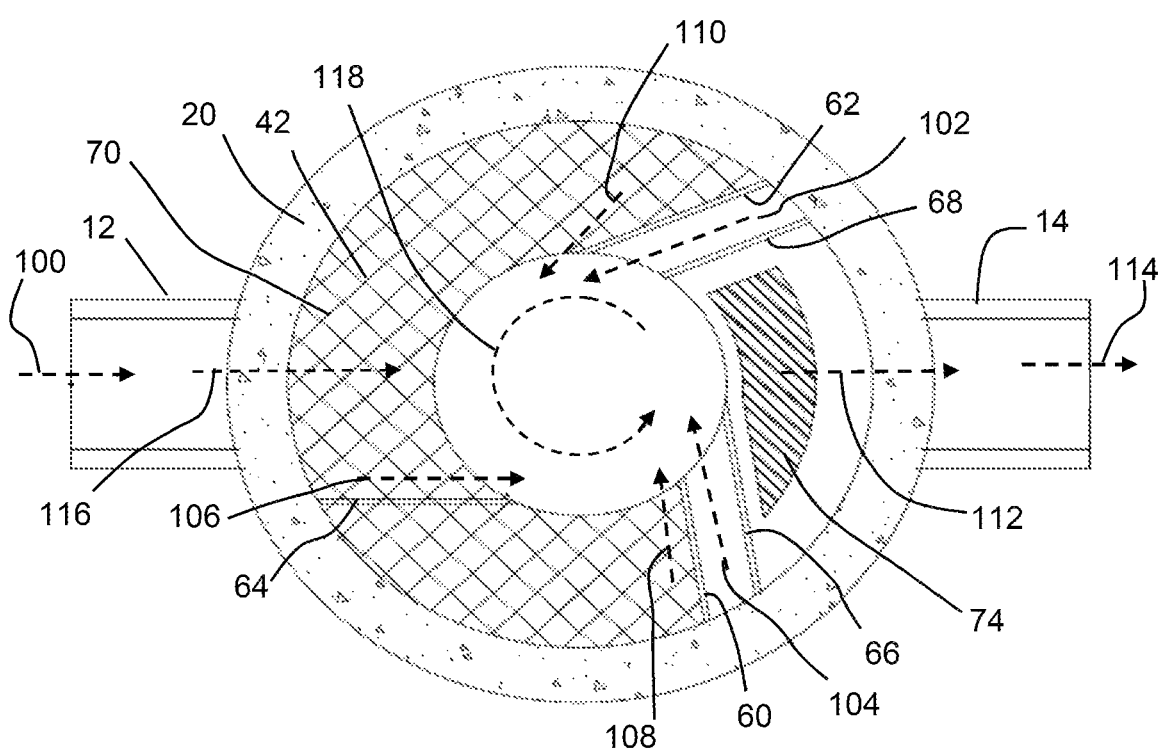
FIG. 4 is a top planar view of the hydrodynamic separator of FIG. 3 showing water flow paths during normal or low water flows.
Figure 5:
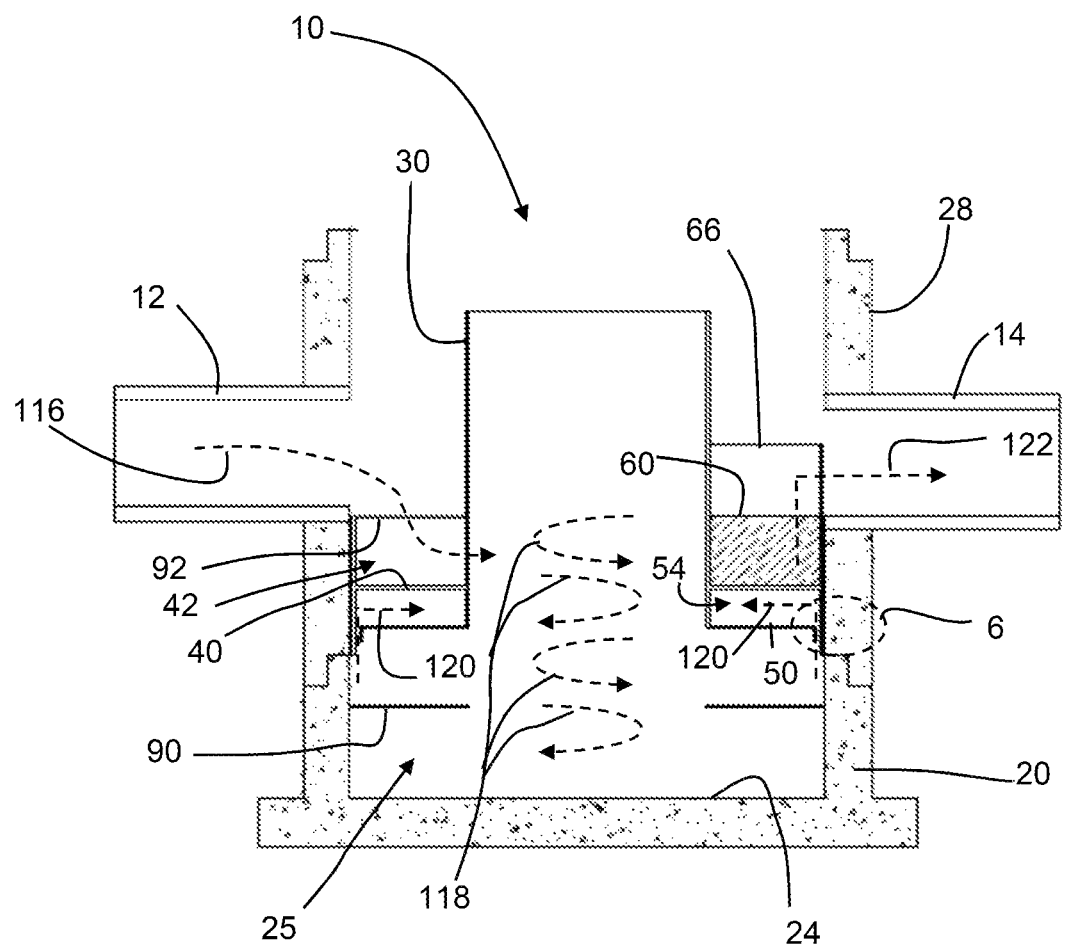
FIG. 5 is a side elevational view of the hydrodynamic separator of FIG. 2 showing water flow paths during normal or low water flows.
Figure 6:
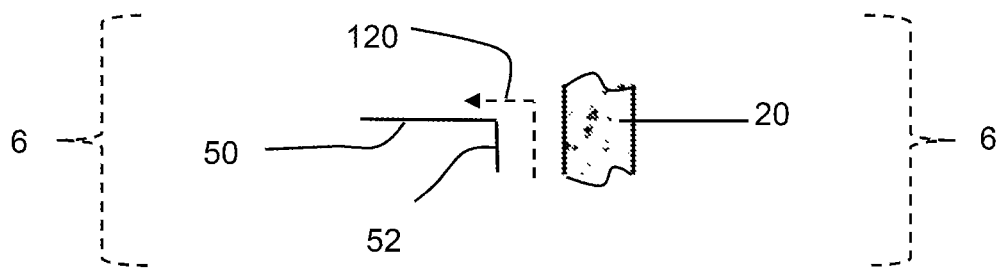
FIG. 6 is an exploded view of a portion of FIG. 2 showing an outlet water flow path.

FIG. 4 is a top planar view of the hydrodynamic separator 10 showing water flow paths during normal or low water flows, and FIG. 5 is a side elevational view of the hydrodynamic separator 10 showing water flow paths during normal or low water flows. Water entering the inlet 12 of the separator assembly 11 is depicted by arrow water inlet flow path 100. Water from the inlet 12 enters the first location for ingress of water 70 within the hydrodynamic separator 10, such as the pretreatment area 42. Different arrows depict an indication of water inlet flow path 102 through opening 86 between the second lower weir 62 and the second higher weir 68, an indication of water inlet flow path 104 through opening 84 between the first lower weir 60 and the first higher weir 66, an indication of an optional water inlet flow path 106 through opening 78 near optional weir 64, an indication of water inlet flow path 108 through opening 78 near the first lower weir 60, and an indication of water inlet flow path 110 through opening 80 near the second lower weir 62. These weirs 60, 62, 64 and openings 78, 80, 82, 84, 86 create water inlet flow paths 102, 104, 106, 108, 110 into the hollow inner portion 38 of the inner member 30 of the hydrodynamic separator 10. The resulting water flow path within the hollow inner portion 38 of the inner member 30 of the hydrodynamic separator 10 is a circular or rotational water flow path 118.

In FIG. 5, a single arrow indication of the overall water inlet flow path 116 depicting water flow paths into the hollow inner portion 38 of the inner member 30 of the hydrodynamic separator 10 is used merely for convenience and simplicity. As depicted in FIG. 5, the water flow path 118 is both rotational and downward, creating a vortex flow path. Water may spiral down the inner chamber 30 into the main settling chamber or lower portion 25, towards the floor 24 of the separator or outer housing 20. An optional lower plate or disk 90 may be provided in the lower portion 25 of the hollow chamber 22. The use of such an optional lower plate 90 may increase sedimentation within the lower portion 25 of the hollow chamber 22 and may protect or inhibit sediment (not shown) below the optional lower plate 90 from scour and resuspension.

As indicated by water flow path 120, water is forced to move along the inner surfaces of lower side wall 26 of the outer housing 20 in an upward vertical direction, and then to flow across a horizontal outlet disk or second plate 50. As indicated by water flow path 122, water then flows from the area 54 between the first and second plates 40, 50 towards the outlet 14. The water flow path is better depicted in FIG. 6 which is an exploded view of a dashed portion 6 of FIG. 5. This vertical upward flow increases the flow path for water egress, prevents short circuiting, and increases settling in the separator assembly 11. The second plate 50 is depicted as being proximal to the open lower end 34 of the hollow inner portion 38 of the hydrodynamic separator 10. The present invention is not so limited and other configurations may suitably be used. For example, the second plate 50 may be disposed upwardly above the open lower end 34 of the hollow inner portion 38. The second plate 50 may also have a downward projection or downward rim portion 52 to, for example, minimize turbulence near the outer housing 20. The bottom of the pre-treatment disk first plate 40 and the outlet disk or second plate 50 form a flow chamber/conduit 54. In a four foot (1.2 meter) diameter test unit the distance between the pre-treatment disk 40 and horizontal outlet disk 50 was about four inches (10.2 centimeters). The outlet disk or second plate 50 may have a downward projection portion 52. Water flows to a second location or outlet 76 on the downstream side of the two high weirs 66, 68. There is an opening 74, which may be arched, in the pre-treatment disk on the outlet side which allows water between the pre-treatment disk 40 and outlet disk 50 to discharge, as indicated by water flow path 112, out of the hydrodynamic separator 10. As indicated by water flow path 114, water would then flow through the outlet 14.

Oil (not shown) in the storm water will typically rise and become trapped once it enters the inner chamber 30 since the holes 78, 80, 82, 84, 86 to the inner chamber 30 are submerged during normal use. Sediment (not shown) falls to the bottom and can be cleaned through the inner chamber 30 or from the pre-treatment area 42. Both oil and sediment may be removed from the separator system 11 via removal or opening of the cap 23 to access the separator system 11 with cleaning tools, such as vacuum cleaning tools.

High flows of storm water bypass or flow over the high weirs 66, 68 preventing oil and solids from being scoured out of the separator system 11 during periods of high water flow.

Figure 7:
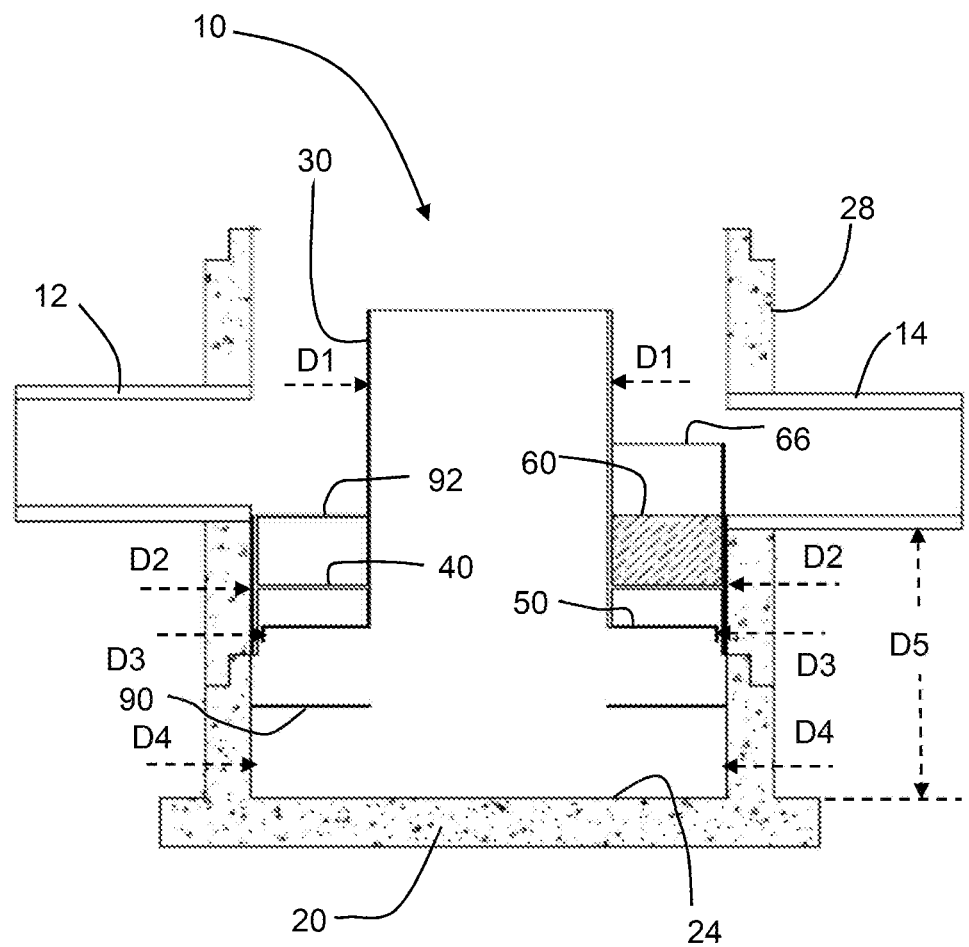
FIG. 7 is a side elevational view of the hydrodynamic separator of FIG. 2 noting relative diameters of select features of the present invention.

FIG. 7 depicts several relative dimensions for the separator assembly 11. As depicted in FIG. 7, D1 is the diameter of the inner chamber 38 of hollow member 30 of the hydrodynamic separator 10, D2 is the diameter of the first plate 40, D3 is the diameter of the second plate 50, D4 is the diameter of the lower portion 25 or the lower side wall 26 of the outer housing 20, and D5 is the sump depth or the distance from the bottom of the outlet 14 to the bottom 24 of the outer housing 20. Desirably, the second diameter (D2) is greater than the first diameter (D1). Moreover, the first diameter (D1) is desirably less than the third diameter (D3) and the third diameter (D3) is desirably less than the second diameter (D2). Desirably, the third diameter (D3) is less than a diameter (D4).

The diameter (D4) of the lower portion 25 or the lower side wall 26 of the outer housing 20 may vary from about 3 feet (0.9 meters), or less than 3 feet (0.9 meters), to about 16 feet (4.9 meters), or greater than 16 feet (4.9 meters). The sump depth (D5) or the distance from the bottom of the outlet 14 to the bottom 24 of the outer housing 20 may vary from about 4 feet (1.2 meters), or less than 4 feet (1.2 meters), to about 12 feet (3.7 meters), or greater than 12 feet (3.7 meters). The length of the inner chamber 30 between its open upper end 32 and its lower open end may vary from about 2 feet (0.60 meters), or less than 2 feet (0.60 meters), to about 6 feet (1.8 meters), or greater than 6 feet (1.8 meters). The diameter of the inlet pipe 12 may vary from about 6 inches (15 centimeters), or less than 6 inches (15 centimeters), to about 72 inches (180 centimeters), or greater than 72 inches (180 centimeters). The volume capacity of the separator system 11 may vary from about 375 gallons (1,420 liters), or less than 375 gallons (1,420 liters), to about 8,035 gallons (30,420 liters), or greater than 8,035 gallons (30,420 liters). The separator system 11 may have an oil capacity from about 95 gallons (375 liters), or less than 95 gallons (375 liters), to about 1,875 gallons (7,100 liters), or greater than 1,875 gallons (7,100 liters). The separator system 11 may also have a sediment capacity from about 30 cubic feet (0.86 cubic meters), or less than 30 cubic feet (0.86 cubic meters), to about 665 cubic feet (18.95 cubic meters), or greater than 665 cubic feet (18.95 cubic meters). Storm water flow rates may vary from about 1 cubic feet per second (28 liters per second) to about 20 cubic feet per second (560 liters per second) at about 50 percent to about 80 percent total solids removal. These dimensions and capacities are non-limiting and other suitable dimensions and capacities may be used.

Figure 8:
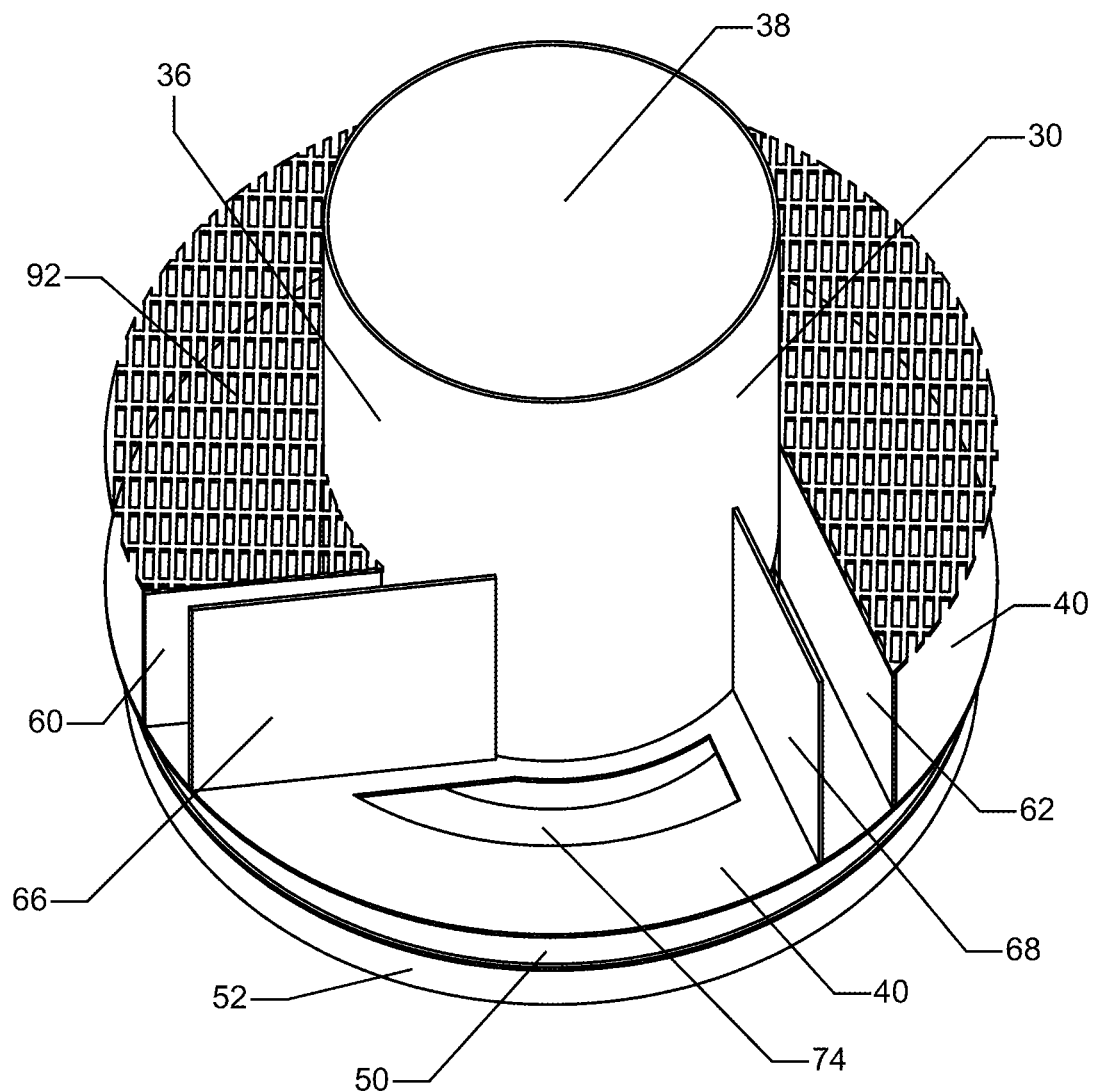
FIG. 8 is a first perspective view the hydrodynamic separator of the present invention.

FIG. 8 is a perspective view of the hydrodynamic separator 10 from an outlet perspective. The opening 74 in the outlet or second plate 50 being disposed between first and second higher weirs 66, 68. The first and second lower weirs 60, 62 are disposed upstream (relative to water flow) of the between first and second higher weirs 66, 68, respectively. The grate or slats 92 are disposed between the first and second lower weirs 60, 62 in an upstream fashion.

Figure 9:
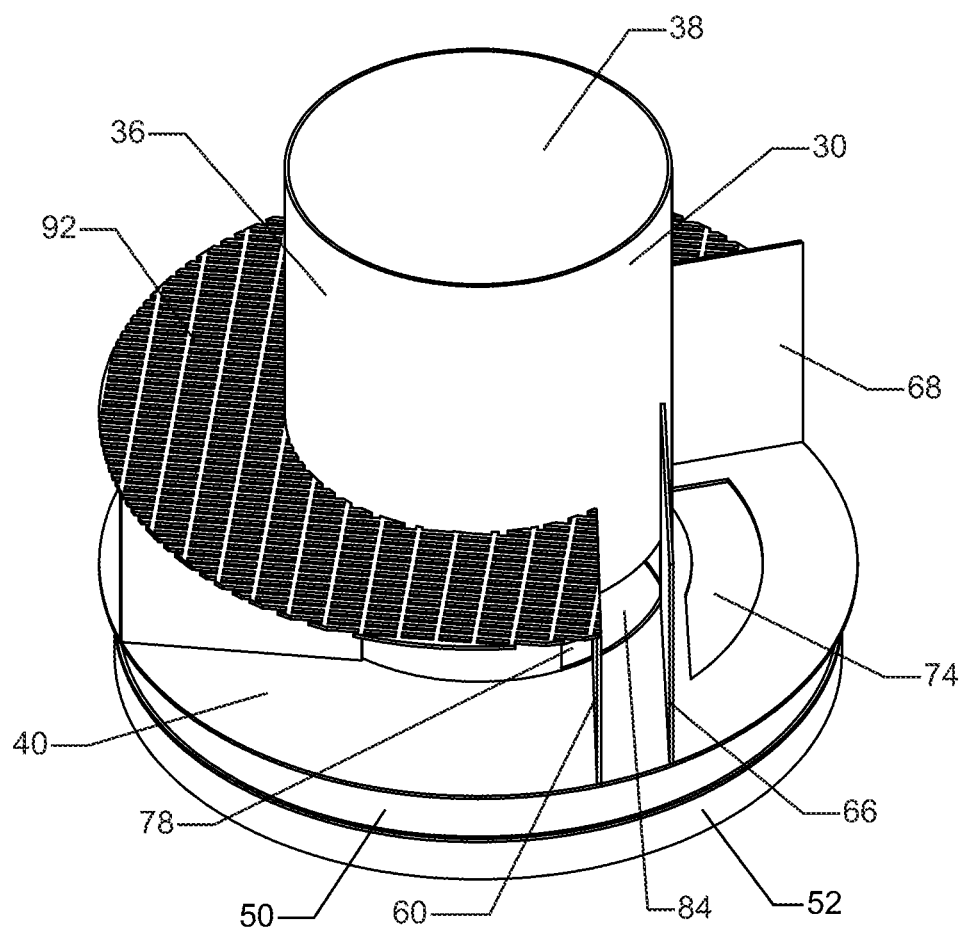
FIG. 9 is a second perspective view the hydrodynamic separator of the present invention.

FIG. 9 is a perspective view of the hydrodynamic separator 10 from the perspective of the first lower weir 60 and the first higher weir 66. The opening 78 through the wall 36 of the inner chamber 30 is disposed proximal and to the left or upstream of the first lower weir 60. The opening 84 through the wall 36 of the inner chamber is disposed between the first lower weir 60 and the first higher weir 66. As depicted in FIG. 9, the area of the opening 84 may be larger than the area for the opening 78.

Figure 10:
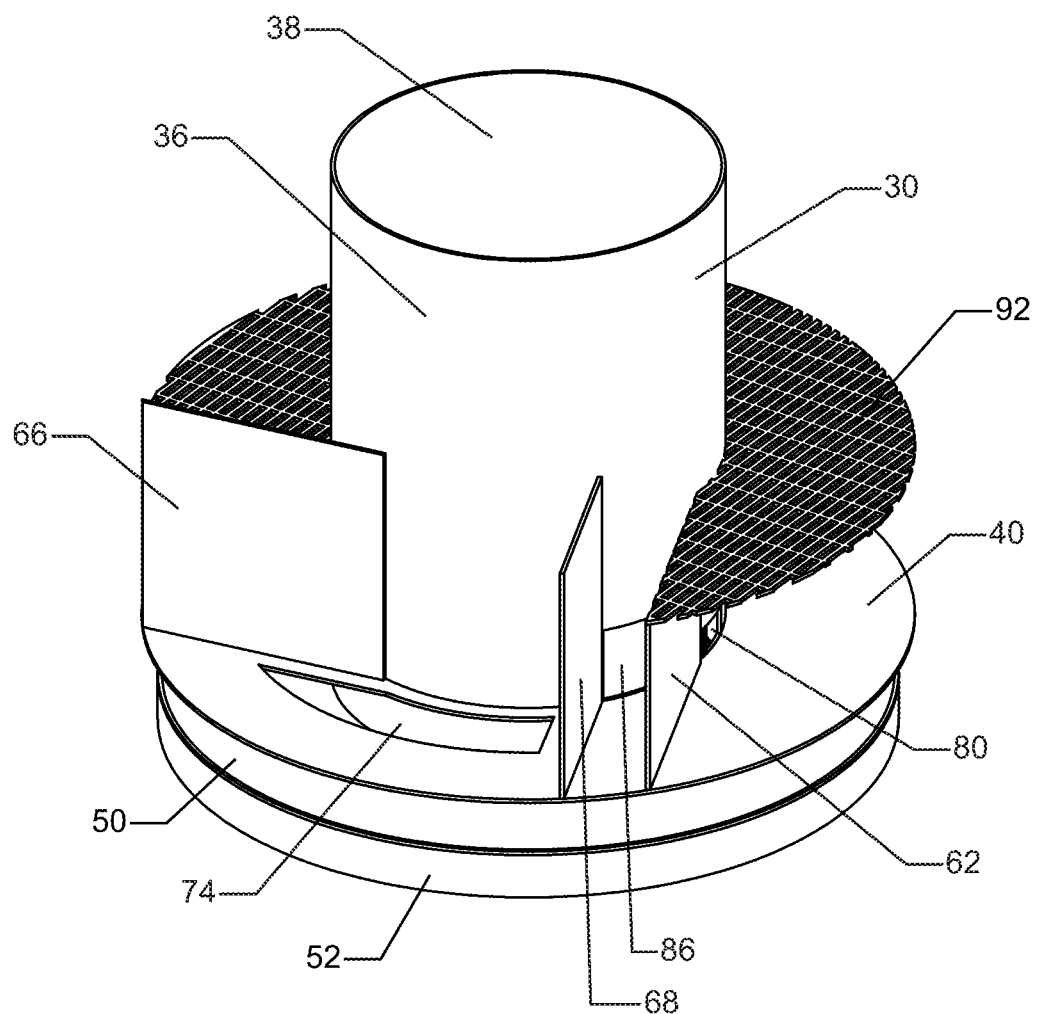
FIG. 10 is a third perspective view the hydrodynamic separator of the present invention.

FIG. 10 is a perspective view of the hydrodynamic separator 10 from the perspective of the second lower weir 62 and the second higher weir 68. The opening 80 through the wall 36 of the inner chamber 30 is disposed proximal and to the right or upstream of the second lower weir 62. The opening 86 through the wall 36 of the inner chamber is disposed between the second lower weir 62 and the second higher weir 68. As depicted in FIG. 10, the area of the opening 86 may be larger than the area for opening the 80.

Figure 11:
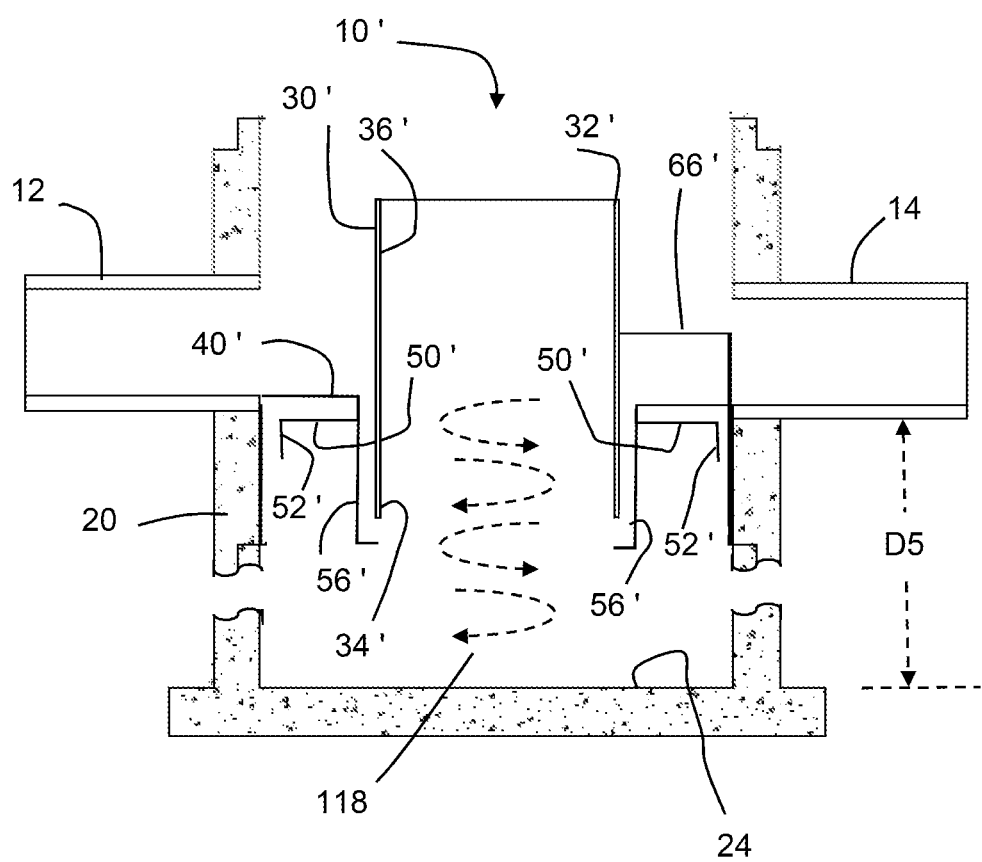
FIG. 11 is a side elevational view of another embodiment of the hydrodynamic separator of the present invention.

FIG. 11 depicts another embodiment or aspect of the present invention. The hydrodynamic separation 10' of FIG. 11 is similar to the above described hydrodynamic separator 10. The grate or slots 92 and the first and second lower weirs 60, 62 of the hydrodynamic separator 10 are removed from the hydrodynamic separator 10'. The first plate 40' and the second plate 50' are moved upward (relative to hydrodynamic separator 10) such that the first plate 40' is at about the invert elevation of the outlet pipe 14. The second plate 50' is also moved upward (relative to hydrodynamic separator 10). As used herein, invert refers to the base interior level of a pipe or conduit. The distance between the first plate 40' and the second plate 50' may be the same or different as the distance between the first plate 40 and the second plate 50. The sump depth (D5) for hydrodynamic separator 10' may be the same or greater than the sump depth (D5) for hydrodynamic separator 10. As the second plate 50' is generally moved upward for the hydrodynamic separator 10' as compared to the hydrodynamic separator 10, a downward projection member 56' may be provided off of the first plate 40' near the tubular wall 36' of the hollow inner member 30'. As depicted in FIG. 11, the downward projection member 56' may extend below the open lower end 34' of the hollow inner member 30'. Water from the first plate 40' may enter the hollow inner member 30' through any convenient means, such as holes through the tubular wall 36' of the hollow inner member 30'. The present invention is not so limited. The hydrodynamic separator 10' may include vertical pipe, typically round, (not shown) with a bend, such as a 90 degree elbow, to provide a flow path from first plate 40' into the hollow inner member 30' and to aid in the forming of a rotational flow pattern 118.

While various embodiments of the present inventive technology are specifically illustrated and/or described herein, it will be appreciated that modifications and variations of the present inventive technology may be effected by those skilled in the art without departing from the spirit and intended scope of the inventive technology. Further, any of the embodiments or aspects of the invention as described in the claims or in the specification may be used with one and another without limitation.

The following aspects, embodiments, and the like of the invention or inventive technology, which are labelled as clauses below, are part of the detailed description for the present invention and may be combined in any fashion and combination and be within the scope of the present invention, as follows:

Clause 1. An assembly (11) for the treatment of storm water, comprising:

an outer housing (20) having a hollow chamber (22) with an upper portion (28), an opposed lower portion (26), a wall (29) therein between, an inlet (12) through the wall (29) for the ingress of storm water, and an outlet (14) through the wall (29) for the egress of water;

a hydrodynamic separator (10) disposed configured to be disposed within the hollow chamber (22), the hydrodynamic separator (10) comprising:

a hollow inner tubular member (30) having an open upper end (32), an opposed open lower end (34), a tubular wall (36) disposed therein between, and at least one hole through the tubular wall configured for entry of storm water, the lower end (34) having a first diameter (D1);

a first plate (40) disposed proximal to the lower end (34) of the hollow inner tubular member (30), the first plate (40) having a second diameter (D2), wherein the second diameter (D2) is greater than the first diameter (D1);

a first lower weir (60) spaced apart from a second lower weir (62), wherein the first and second lower weirs (60, 62) extend upward from the first plate (40);

a first higher weir (66) disposed proximal to the first lower weir (60), the first higher weir (66) extending upward from the first plate (40) and having a height greater than a height of the first lower weir (60);

a second higher weir (68) disposed proximal to the second lower weir (62), the second higher weir (66) extending upward from the first plate (40) and having a height greater than a height of the second lower weir (62); and a second plate (50) disposed below the first plate (40), the second plate (50) having a third diameter (D3), wherein the first diameter (D1) is less than the third diameter (D3) and the third diameter (D3) is less than the second diameter (D2);

wherein the hydrodynamic separator (10) is configured to allow ingress of storm water from a first location (70) between the first lower weir (60) and the second lower weir (62), the first location (70) being defined by a first angular extent between the first and second lower weirs (60, 62);

wherein the first and second plates (40, 50) are configured to be disposed about the lower end (34) of the hollow tubular member (30); and wherein the first plate (40) has an opening (74) configured to allow egress of storm water to a second location (76) between the first higher weir (66) and the second higher weir (68), wherein the second location (76) is defined by a second angular extent opposed from the first angular extent.

Clause 2. The assembly (11) of clause 1 or alternatively any preceding clause, wherein the first plate (40) is sealingly disposed at the wall (29) of the outer housing to define a pre-treatment area (42) there above.

Clause 3. The assembly (11) of clause 1 or alternatively any preceding clause, wherein the second diameter (D3) of the second plate (50) is less than a diameter (D4) of the lower portion (26) of the outer housing (20) to permit flow of water from within the lower portion (26) of the outer housing (20) to the opening (74) of the first plate (40).

Clause 4. The assembly (11) of clause 1 or alternatively any preceding clause, wherein the tubular wall (36) of the hollow inner member (30) has an opening (78) proximal to the first lower weir (60) for ingress of water from the first location (70) into the hollow inner member (30).

Clause 5. The assembly (11) of clause 1 or alternatively any preceding clause, wherein the tubular wall (36) of the hollow inner member (30) has an opening (80) proximal to the second lower weir (62) for ingress of water from the first location (70) into the hollow inner member (30).

Clause 6. The assembly (11) of clause 1 or alternatively any preceding clause, wherein the hydrodynamic separator (10) further comprises:

a third lower weir (64) extending upward from the first plate (40), the third weir (64) being located in the first location 70 between the first and second lower weirs (60, 62); and an opening (82) in the tubular wall (36) of the hollow inner member (30) proximal the third lower weir (64) for ingress of water from the first location (70) into the hollow inner member (30).

Clause 7. The assembly (11) of clause 1 or alternatively any preceding clause, wherein a height of the first lower weir (60) is about the same as the height of a second lower weir (62).

Clause 8. The assembly (11) of clause 7 or alternatively any preceding clause, wherein the heights of the first and second lower weirs (60, 62) generally correspond to a distance from a lower portion of the inlet (12) to the first plate (40).

Clause 9. The assembly (11) of clause 7 or alternatively any preceding clauses 1-7, wherein the heights of the first and second lower weirs (60, 62) generally correspond to a distance from at or above a lower portion of the inlet (12) to the first plate (40).

Clause 10. The assembly (11) of clause 9 or alternatively any preceding clause, wherein a height of the third lower weir (64) is about the same as the heights of the first and second lower weirs (60, 62).

Clause 11. The assembly (11) of clause 10 or any preceding clause, wherein the hydrodynamic separator (10) further comprises:

an opening (84) in the tubular wall (36) of the hollow inner member (30) between the first lower weir (60) and the first higher weir (66) for ingress of water into the hollow inner member (30); and an opening (86) in the tubular wall (36) of the hollow inner member (30) between the second lower weir (62) and the second higher weir (68) for ingress of water into the hollow inner member (30).

Clause 12. The assembly (11) of clause 1 or alternatively any preceding clause, wherein the heights of the first and second higher weirs (66, 68) generally corresponds to a distance from at or above a lower portion of the inlet (12) to the first plate (40).

Clause 13. The assembly (11) of clause 1 or alternatively any preceding clause, wherein, when in use, flow of water within the hollow inner tubular member (30) is at least partially tangential to the tubular wall (36) of the hollow inner tubular member (30) so as to create a rotational flow pattern of water.

Clause 14. A device (10) for the treatment of storm water, comprising:

a hollow inner tubular member (30) having an open upper end (32), an opposed open lower end (34), a tubular wall (36) disposed therein between, and at least one hole through the tubular wall configured for entry of storm water, the lower end (34) having a first diameter (D1);

a first plate (40) disposed proximal to the lower end (34) of the hollow inner tubular member (30), the first plate (40) having a second diameter (D2), wherein the second diameter (D2) is greater than the first diameter (D1);

a first lower weir (60) spaced apart from a lower second weir (62), wherein the first and lower second weirs (60, 62) extend upward from the first plate (40);

a first higher weir (66) disposed proximal to the first lower weir (60), the first higher weir (66) extending upward from the first plate (40) and having a height greater than a height of the first lower weir (60); and a second higher weir (68) disposed proximal to the second lower weir (62), the second higher weir (66) extending upward from the first plate (40) and having a height greater than a height of the second lower weir (62); and a second plate (50) disposed below the first plate (40), the second plate (50) having a third diameter (D3), wherein the first diameter (D1) is less than the third diameter (D3) and the third diameter (D3) is less than the second diameter (D2);

wherein the device (10) is configured to allow ingress of storm water from a first location (70) between the first weir (60) and the second weir (62), the first location (70) being defined by a first angular extent between the first and second weirs (60, 62);

wherein the first and second plates (40, 50) are configured to be disposed about the lower end (34) of the hollow tubular member (30); and wherein the first plate (40) has an opening (74) configured to allow egress of storm water to a second location (76) between the first higher weir (66) and the second higher weir (68), wherein the second location (76) is defined by a second angular extent opposed from the first angular extent.

Clause 15. The device (10) of clause 14, wherein the tubular wall (36) of the hollow inner member (30) has an opening (78) proximal to the first lower weir (60) for ingress of water from the first location (70) into the hollow inner member (30).

Clause 16. The device (10) of clause 14 or alternatively clauses 14-15, wherein the tubular wall (36) of the hollow inner member (30) has an opening (80) proximal to the second lower weir (60) for ingress of water from the first location (70) into the hollow inner member (30).

Clause 17. The device (10) of clause 14 or alternatively clauses 14-16, wherein a height of the first lower weir (60) is about the same as the height of a second lower weir (62).

Clause 18. The device (10) of clause 17 or alternatively clauses 14-17, wherein the heights of the first and second lower weirs (60, 62) generally corresponds to a distance from a lower portion of the inlet (12) to the first plate (40).

Clause 19. The device of clause 17 or alternatively clauses 14-17, wherein the heights of the first and second lower weirs (60, 62) generally correspond to a distance from at or above a lower portion of the inlet (12) to the first plate (40).

Clause 20. A method for treating storm water comprising: utilizing the assembly of any of the clauses 1-13 or the device of any of the clauses 14-19 for the removal of oil, sediments or suspended solids from storm water.

The invention claimed is:

1. An assembly for the treatment of storm water, comprising:
    an outer housing having a hollow chamber with an upper portion, an opposed lower portion, a wall therein between, an inlet through the wall for the ingress of storm water, and an outlet through the wall for the egress of water;
    a hydrodynamic separator disposed configured to be disposed within the hollow chamber, the hydrodynamic separator comprising:
        a hollow inner tubular member having an open upper end, an opposed open lower end, a tubular wall disposed therein between, and at least one hole through the tubular wall configured for entry of storm water, the lower end having a first diameter;
        a first plate disposed proximal to the lower end of the hollow inner tubular member, the first plate having a second diameter, wherein the second diameter is greater than the first diameter;
        a first lower weir spaced apart from a second lower weir, wherein the first and second lower weirs extend upward from the first plate;
        a first higher weir disposed proximal to the first lower weir, the first higher weir extending upward from the first plate and having a height greater than a height of the first lower weir;
        a second higher weir disposed proximal to the second lower weir, the second higher weir extending upward from the first plate and having a height greater than a height of the second lower weir; and
        a second plate disposed below the first plate, the second plate having a third diameter, wherein the first diameter is less than the third diameter and the third diameter is less than the second diameter;
    wherein the hydrodynamic separator is configured to allow ingress of storm water from a first location between the first lower weir and the second lower weir, the first location being defined by a first angular extent between the first and second lower weirs;
    wherein the first and second plates are configured to be disposed about the lower end of the hollow tubular member; and
    wherein the first plate has an opening configured to allow egress of storm water to a second location between the first higher weir and the second higher weir, wherein the second location is defined by a second angular extent opposed from the first angular extent.

2. The assembly of claim 1, wherein the first plate is sealingly disposed at the wall of the outer housing to define a pre-treatment area there above.

3. The assembly of claim 1, wherein the second diameter of the second plate is less than a diameter of the lower portion of the outer housing to permit flow of water from within the lower portion of the outer housing to the opening of the first plate.

4. The assembly of claim 1, wherein the tubular wall of the hollow inner member has an opening proximal to the first lower weir for ingress of water from the first location into the hollow inner member.

5. The assembly of claim 1, wherein the tubular wall of the hollow inner member has an opening proximal to the second lower weir for ingress of water from the first location into the hollow inner member.

6. The assembly of claim 1, wherein the hydrodynamic separator further comprises:
    a third lower weir extending upward from the first plate, the third weir being located in the first location between the first and second lower weirs; and
    an opening in the tubular wall of the hollow inner member proximal the third lower weir for ingress of water from the first location into the hollow inner member.

7. The assembly of claim 6, wherein a height of the first lower weir is about the same as the height of a second lower weir.

8. The assembly of claim 7, wherein the heights of the first and second lower weirs generally correspond to a distance from a lower portion of the inlet to the first plate.

9. The assembly of claim 7, wherein the heights of the first and second lower weirs generally correspond to a distance from at or above a lower portion of the inlet to the first plate.

10. The assembly of claim 9, wherein a height of the third lower weir is about the same as the heights of the first and second lower weirs.

11. The assembly of claim 10, wherein the hydrodynamic separator further comprises:
an opening in the tubular wall of the hollow inner member between the first lower weir and the first higher weir for ingress of water into the hollow inner member; and
an opening in the tubular wall of the hollow inner member between the second lower weir and the second higher weir for ingress of water into the hollow inner member.

12. The assembly of claim 1, wherein the heights of the first and second higher weirs generally corresponds to a distance from at or above a lower portion of the inlet to the first plate.

13. The assembly of claim 1, wherein, when in use, flow of water within the hollow inner tubular member is at least partially tangential to the tubular wall of the hollow inner tubular member so as to create a rotational flow pattern of water.

14. A device for the treatment of storm water, comprising:
a hollow inner tubular member having an open upper end, an opposed open lower end, a tubular wall disposed therein between, and at least one hole through the tubular wall configured for entry of storm water, the lower end having a first diameter;
a first plate disposed proximal to the lower end of the hollow inner tubular member, the first plate having a second diameter, wherein the second diameter is greater than the first diameter;
a first lower weir spaced apart from a lower second weir, wherein the first and lower second weirs extend upward from the first plate;
a first higher weir disposed proximal to the first lower weir, the first higher weir extending upward from the first plate and having a height greater than a height of the first lower weir; and
a second higher weir disposed proximal to the second lower weir, the second higher weir extending upward from the first plate and having a height greater than a height of the second lower weir; and
a second plate disposed below the first plate, the second plate having a third diameter, wherein the first diameter is less than the third diameter and the third diameter is less than the second diameter;
wherein the device is configured to allow ingress of storm water from a first location between the first weir and the second weir, the first location being defined by a first angular extent between the first and second weirs;
wherein the first and second plates are configured to be disposed about the lower end of the hollow tubular member; and
wherein the first plate has an opening configured to allow egress of storm water to a second location between the first higher weir and the second higher weir, wherein the second location is defined by a second angular extent opposed from the first angular extent.

15. The device of claim 14, wherein the tubular wall of the hollow inner member has an opening proximal to the first lower weir for ingress of water from the first location into the hollow inner member.

16. The device of claim 14, wherein the tubular wall of the hollow inner member has an opening proximal to the second lower weir for ingress of water from the first location into the hollow inner member.

17. The device of claim 14, wherein a height of the first lower weir is about the same as the height of a second lower weir.

18. The device of claim 17, wherein the heights of the first and second lower weirs generally corresponds to a distance from a lower portion of the inlet to the first plate.

19. The device of claim 17, wherein the heights of the first and second lower weirs generally correspond to a distance from at or above a lower portion of the inlet to the first plate.

20. A method for treating storm water comprising:
utilizing the device of claim 14 for the removal of oil, sediments or suspended solids from storm water.

\* \* \* \* \*